June 11, 1963 J. D. GOODELL 3,093,747

MAGNETIC SIGNAL STORAGE LOGIC COMPUTING ELEMENT

Original Filed Aug. 23, 1954 3 Sheets-Sheet 1

INVENTOR.
JOHN D. GOODELL
BY [signature]
ATTORNEY

June 11, 1963 J. D. GOODELL 3,093,747

MAGNETIC SIGNAL STORAGE LOGIC COMPUTING ELEMENT

Original Filed Aug. 23, 1954 3 Sheets-Sheet 2

3,093,747
Patented June 11, 1963

3,093,747

MAGNETIC SIGNAL STORAGE LOGIC COMPUTING ELEMENT

John D. Goodell, Silver Spring, Md., assignor, by mesne assignments, to General Precision, Inc., a corporation of Delaware Continuation of application Ser. No. 451,484, Aug. 23, 1954. This application June 27, 1960, Ser. No. 38,958
6 Claims. (Cl. 307—88)

The present invention relates to magnetic circuit elements for use in computing systems, and the like. In particular, the invention is directed to magnetic logic circuit elements of the pulse storage type which are especially adapted for use in computing systems and machines.

The present application is a continuation of co-pending application, S.N. 451,484, now abandoned, which was filed August 23, 1954.

In United States Patent 2,914,753, which issued November 24, 1959, a logical system for a computing system is disclosed which uses magnetic logic circuit elements. In that system, certain ones of the magnetic logic circuit elements were designated type "A." These logic elements had the property of producing an output signal if, and only if, an input signal was received on either or both of the input lines. The patent also describes a second type of magnetic logic circuit element designated type "S," this latter type being a negation of the type "A" element. The type "S" logic element produces an output signal if, and only if, no input signal is received on any of its input lines, and this latter computing element produces no output signal if, and only if, an input signal is received on one or more of the input lines.

The magnetic logic circuit elements described in the patent referred to in the preceding paragraph are of the so-called transformer type. These include a magnetic core and input and output windings associated with the core. In the type of element described in the patent, a change of flux in the magnetic core produces an output voltage in the output winding. The output voltage is necessarily limited by the energy storage capacity of the flux change in the core, and certain difficulties are experienced with noise in the unit.

An important object of the present invention is to provide magnetic logic circuit elements of the general type discussed above, but which are not predicated on purely transformer concepts and which have increased power output and a high signal-to-noise ratio, as compared with the prior art elements of this general type.

Another object of the invention is to provide an improved magnetic logic circuit element of the general type under discussion and which is constructed to have universal application, so that a complete computing system can be constructed by the use of a plurality of such universal logic elements; each of the elements being adaptable to perform the different logic computing functions required in the computing system.

The last mentioned object is realized in the practice of one embodiment of the invention by the provision of a magnetic logic circuit element of the "S" type, which functions in the manner described above, and which logic element includes circuitry and components to enable it to synthesize logic elements which may be made to function in a manner to fulfill all the different logic requirements of a present-day computing system.

For example, the universal logic element of the embodiment of the invention to be described may be adapted to function as a type "A" or type "S" element to fulfill the above described functions, and the universal logic element of the invention may also be adapted to function as a "C" type of element. Moreover, the universal logic element of the invention performs these different functions merely by the appropriate choice of different input lines for the different logic functions.

In general, the above objects are achieved by constructing a universal logic element, in a manner to be described, from an "S" type magnetic element. The "S" type element includes a magnetic core, and an input winding and a combined clock and output winding disposed on the core in magnetically coupled relationship with the core. A load circuit is connected in series with the output winding. Assuming that a clock pulse introduced to the output winding has magnetized the core to a first polarity, the input winding is so poled with respect to the core that an input signal introduced to the input winding will change the core magnetization to the opposite polarity. When the next clock pulse is introduced to the output winding; the impedance of the output winding, due to the energy expended by the clock pulse in swinging the flux in the core back to the first polarity, is so great that substantially all the clock pulse voltage appears across the output winding and essentially no output pulse appears across the load circuit. However, if no input signal has been received during the input time, the following clock pulse is unimpeded, except for perhaps a small direct-current resistance in the output winding, so that substantially all the clock voltage appears across the load circuit to produce an output pulse.

From the single series type of logic circuit element described in the preceding paragraph, all the types of logic elements required in a computing system may be synthesized, as will be described. For example, the single universal logic element may be adapted, as will be described, to function as the type "A" or type "S" logic element described above, and also as a type "D," a type "E" and a type "L" logic element. These different types of logic elements may best be represented by the following logic equations:

| | | |
|---|---|---|
| "S" Type | $\bar{O}=p+q$<br>$O=\bar{p}.\bar{q}$ | O—output,<br>p—first input.<br>q—second input. |
| "A" Type | $\bar{O}=\bar{p}.\bar{q}$<br>$O=p+q$ | O—output.<br>p—first input.<br>q—second input. |
| "C" Type | $\bar{O}=r.\bar{q}$<br>$O=\bar{r}+q$ | O—output.<br>r—first input.<br>q—second input. |
| "E" Type | $\bar{O}=r.\bar{p}+\bar{r}.\bar{q}$<br>$O=r.q+\bar{r}.\bar{q}$ | O—output.<br>r—first input.<br>q—second input. |
| "D" Type | $\bar{O}=r.q$<br>$O=\bar{r}+\bar{q}$ | O—output.<br>r—first input.<br>q—second input. |

In the series-type magnetic logic circuit elements illustrated in FIGURES 1–6, the illustrated windings are poled to produce fluxes in the corresponding magnetic cores in relative directions as represented by the dots adjacent the respective windings. These windings are capable of producing flux saturation in the cores of a positive polarity and of a negative polarity, and the cores exhibit the properties of bistable flux remanence.

Figure 1:
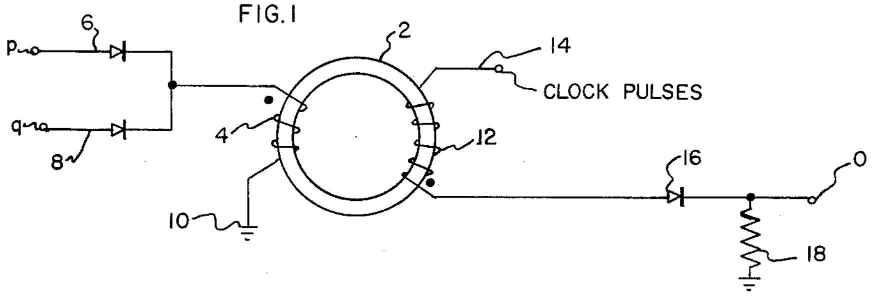
FIGURE 1 is a circuit diagram of a series-type magnetic logic circuit element of the "S" type referred to above.

In FIGURE 1, the illustrated magnetic logic circuit element is composed of a magnetic core 2 having bistable flux remanence properties. The logic element is provided with an input inductance winding 4. This winding is magnetically coupled to the core 2, and it is connected to two or more input lines 6 and 8 and to ground 10. A signal mixing diode is included for each of the input lines, as illustrated. The core is also provided with a combined clock and output inductance winding 12 which is connected in one end to a clock signal line 14 and at the other end to the anode of a diode 16. The cathode of the diode 16 is connected to a load circuit represented by a grounded resistor 18, and which may be another magnetic pulse storage computing element of the type described herein.

The output O is derived across the load circuit. The windings 4 and 12 are poled in opposite directions with respect to the flux produced thereby in the magnetic core 2, this being represented by the dots adjacent the windings in FIGURE 1.

The logic circuit element of FIGURE 1 functions in a manner based on the principle that the impedance of the inductance winding 12 is high, if the flux is changing in the core 2 as a function of a clock pulse received on the clock signal line 14; and, conversely, that the impedance of the winding 12 is low, if no flux is changing in the core as a function of a received clock pulse. The winding 12 and the load circuit 18 may be considered as a voltage divider, with the clock winding functioning as a variable impedance having a relatively high impedance in one condition and having a relatively low impedance in another.

Therefore, when the flux in the magnetic core 2 has not been changed by the occurrence of an input signal between successive clock pulses, the first clock pulse drives the core to positive saturation and successive clock pulses have no effect in changing the polarity of the flux. The impedance of the inductance winding 12 is relatively low for these successive clock pulses, therefore, and they produce pulses which appear largely across the load circuit 18. For this state, therefore, each clock pulse received on the line 14 produces an output voltage level which is in what may be considered a binary "1" state. In this instance, the winding 12 is almost a short circuit to the successive clock pulses, since these clock pulses produce no flux change in the core 2.

However, should an input signal *p* or *q* be received on either the input line 6 or on the input line 8, such input signal drives the core 2 to what may be considered negative saturation polarity, and in a sense opposite to the saturation polarity produced by the clock pulses. Then the winding 12 will exhibit a relatively high impedance to the next succeeding clock pulse and during the entire time required by the next succeeding clock pulse to swing the core 2 back to positive polarity saturation. The voltage produced by the clock pulse following the introduction of such input signal will appear, therefore, for the most part across the winding 12. The output voltage across the load circuit will be reduced to zero for this latter condition, and the output signal level will represent binary zero.

The logic circuit element of FIGURE 1, therefore, functions to perform the "S" type of logic, as represented by the equations:

$$p+q=\overline{O}$$
$$\overline{p}.\overline{q}=O$$

In the series-type magnetic logic circuit element of FIGURE 1, the production of noise is substantially reduced as compared with the prior art transformer type of magnetic elements, such as described in the patent referred to above. The storage of a "1" represents the maximum average impedance for the winding 12 and minimum power requisite from the clock source for a given load condition, and a noise output that is defined by the volt-seconds integral of the pulse versus the magnetic dimensions of the core 2. The storage of a "0" in the described element of FIGURE 1 constitutes a condition in which, since the impedance of the winding 12 is almost a short circuit, maximum power is available to the load.

The core 2 may be constructed, for example, of 20 wraps of 3/16 inch by 1/8 inch by 5 w. 1/8 mil 4–79 Mo Permalloy on a toroid. The diodes may be of the type presently designated In69. The amplitude of the clock pulses received on the line 14 may, for example, be of the order of 20 volts, with input and output rise and fall times of 5 microseconds each. The input winding 4 may have 150 turns, and the output winding 12 may have 200 turns, for example. The input windings of FIGURES 4 and 5, as will be described, are each subdivided into two windings of 75 turns each.

In the computing system utilizing the magnetic logic circuit elements of the type under discussion, the elements are connected in series, and each element drives one or more succeeding elements. The logic element of FIGURE 1 can theoretically drive an unlimited number of succeeding like elements, inasmuch as substantially the full clock power is available. The limit on the number of logic elements which can be so driven depends upon how much of a current the winding 12 can handle, and on other conditions affecting circuit stability.

Figure 2:
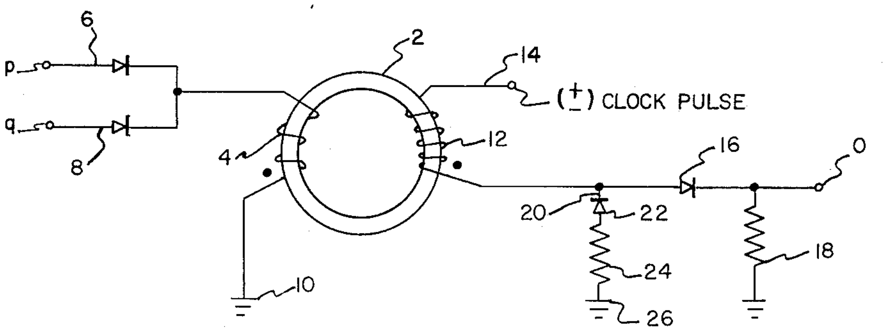
FIGURE 2 is a circuit diagram of a series-type magnetic logic circuit element of the "A" type referred to above.
Figure 3:
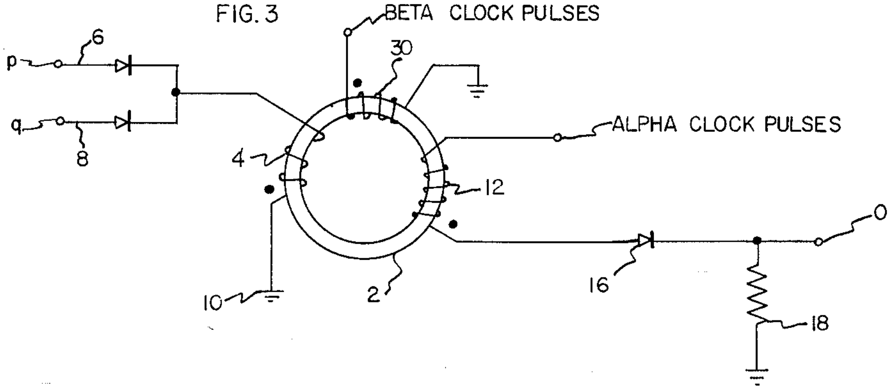
FIGURE 3 is a circuit diagram of a modified form of a magnetic logic circuit element of the "A" type.

The magnetic logic circuit elements of FIGURES 2 and 3, as noted above are of the "A" type. It is known that from the logical point of view it is possible to construct a complete computing system using logic elements which basically function as one type, and from which all other types may be synthesized. The logic element commonly used as the base is the "S" type of element, this type functioning in the manner described above, and in the above mentioned Patent 2,914,753.

As shown in FIGURE 2, a magnetic logic circuit element of the "A" type is provided by introducing a re-set circuit into the circuit of the element. The object of the re-set circuit is to continuously return the flux in the magnetic core 2 to negative polarity saturation between successive clock pulses and in the absence of an input signal. The presence of an input signal, unlike the circuit of FIGURE 1, tends to drive the magnetic core of the element of FIGURE 2 to positive polarity saturation so as to overcome the effect of the re-set circuit.

The input winding 4 on the magnetic core 2 in FIGURE 2 is similar to the input winding in FIGURE 1, except that the winding 4 in FIGURE 2 is oppositely poled with respect to the magnetic core as compared with the winding 4 in FIGURE 1. The winding 12 in FIGURE 2 is similar in all respects to the winding 12 in FIGURE 1. A re-set line 20 is connected to the output line between the winding 12 and the diode 16. The re-set line 20 contains a diode 22 connected in series with a resistor 24, the resistor 24 being connected to ground 26. The winding 4 in FIGURE 2, as noted above, is poled oppositely to the winding 4 in FIGURE 1 to be in the same direction in FIGURE 2 as the winding 12.

Both positive and negative excursions of the clock pulses are applied to the winding 12 by way of the line 14. The positive excursions of each clock pulse flows in the load circuit 18 and the following negative excursion flows in the re-set line 20. These flows of the positive and negative excursions are realized because of the polarities of the diodes 16 and 22. Therefore, in the absence of an input signal in the input winding 4, the positive excursion of each successive clock pulse swings the core 2 from negative polarity saturation to positive polarity saturation, and the following negative excursion of each successive clock pulse re-sets the core 2 to negative saturation. During this operation the output "O" is at the binary zero level. However, should an input signal *p* or *q* be received on the lines 6 or 8, this input signal has the effect of cancelling the re-set effect of the negative excursion of the corresponding clock pulse. This means that the positive excursion of the corresponding clock pulse will appear across the load circuit and the output signal O will be at the binary "1" level. The logic circuit element of FIGURE 2 functions, therefore, as an "A" type, in which:

$$p+q=O$$
$$\overline{p}.\overline{q}=\overline{O}$$

The magnetic logic circuit element of FIGURE 3 utilizes two series of clock pulses which are displaced in phase with respect to one another. One of these series of clock pulses, referred to as the "alpha" clock pulses, trigger the element at alpha time; and the other series of clock pulses referred to as the "beta" clock pulses trigger the element at beta time.

In the logic circuit element of FIGURE 3, the same result as in FIGURE 2 is obtained by adding a winding 30 to the core 2, and by introducing the alpha clock pulses to the winding 12 and the beta clock pulses to the winding 30. The winding 30 is so poled that the beta clock pulses function (like the negative excursions of the clock pulses in FIGURE 2) to return the core to negtaive saturation after each alpha clock pulse. However, if an input signal *p* or *q* is received, it cancels the effect of the corresponding beta clock pulse so that the corresponding alpha clock pulse produces an output O=1 across the load circuit. Therefore, the logic circuit element of FIGURE 3, likewise, follows the "A" type of logic in which:

$$p+q=O$$
$$\overline{p}.\overline{q}=\overline{O}$$

Figure 4:
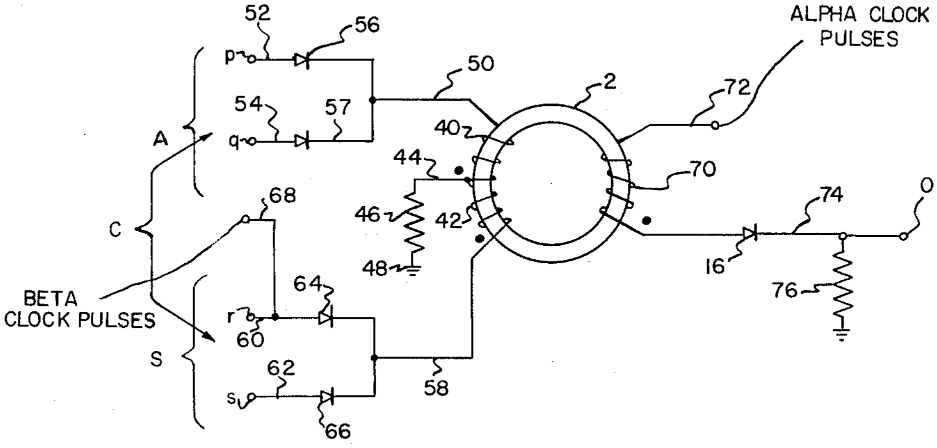
FIGURE 4 is a circuit diagram of a universal magnetic logic circuit element which may be adapted to function as any selected one of a variety of the above mentioned types.

FIGURE 4 shows a universal type of logic circuit element which is capable of providing the different types of logic computing functions described above, depending upon which ones of a plurality of input lines included in the circuit are used. The universal circuit element of FIGURE 4 includes a magnetic core 2, which is capable of being saturated with magnetic fluxes of opposite polarities and of exhibiting the properties of bistable flux remanence.

A first winding 40 is positioned on the core 2 in magnetically coupled relationship with the core, and this winding is connected to an oppositely poled winding 42 to form an input winding. The center tap 44 of the input winding is connected to a resistor 46 which, in turn, is connected to a point of reference potential 48, such as ground. The input line 50 for the winding 40 is connected to a pair of input lines 52 and 54, and a pair of signal mixing diodes 56 and 57 is included in respective ones of these latter input lines. The winding 42 is similarly connected through a line 58 to a pair of input lines 60 and 62, and the input lines 60 and 62 have respective diodes 64 and 66 included therein. The line 60 also includes a line 68 which receives the beta clock pulses referred to above.

The universal circuit element of FIGURE 4 also includes an output winding 70 which is positioned on the core 2, in magnetically coupled relationship with the core. A line 72 is connected to one terminal of the output winding, and this line receives the alpha clock pulses referred to above. The other terminal of the output winding is connected through a diode 16 and through an output line 74 to one terminal of a load circuit. This load circuit is represented by a grounded resistor 76.

In order for the logic circuit element of FIGURE 4 to operate as an "S" type of logic element, such as described in FIGURE 1, the winding 42 performs the function of the winding 4 in FIGURE 1, and the input lines 52, 54 and 68 are not used. The windings 42 and 70 are oppositely poled, as shown by the dots adjacent those windings. Therefore, when the lines 60 and 62 are used as input lines, the circuit is caused to perform as an "S" type of logic element.

An input signal "*r*" received on the line 60, or an input signal "*s*" received on the line 62, drives the core member 2 to negative polarity saturation, for example; and the alpha clock pulses received on the line 72 drive the core member 2 to positive polarity saturation, for example. Therefore, in the manner explained, an output signal is derived across the load circuit 70 in response to an alpha clock pulse, only in the absence of both input signals *r* and *s*. Expressed logically, the "S" type logic element functions in the following manner:

$$r+s=\overline{O}$$
$$\overline{r}.\overline{s}=O$$

In order for the universal circuit element of FIGURE 4 to operate as an "A" type of logic element, such as described in FIGURE 3, the winding 40 performs the function of the winding 4 in FIGURE 3, and the input lines 52 and 54 are used. The input line 68 is also used, so that the beta clock pulses may be supplied to the winding 42 to cause the winding 42 to perform the function of the winding 30 in FIGURE 3. The input lines 60 and 62 are not used.

An input signal *p* received in the line 52, or an input signal *q* received on the line 54, drives the core member 2 to positive polarity saturation. The beta clock pulses introduced through the input line 68 drive the core to negative polarity saturation in the absence of input signals *p* or *q* on the lines 52 or 54. Therefore, an alpha clock pulse introduced to the winding 70 by the line 72 produces an output signal across the load circuit 76 only in the presence of an input signal on the lines 52 or 54.

The above action produces the "A" type of function, which may be expressed logically as:

$$p.q=O$$
$$\overline{p}+\overline{q}=\overline{O}$$

In order for the logic circuit element of FIGURE 4 to operate as a "C" type of logic element, the input lines 54 and 60 are used; but the input lines 52, 62 and 68 are not used. An input signal "*p*" received on the input line 52 will cause the magnetic core member 2 to be driven to negative polarity saturation, only if no input signal "*r*" is received on the input line 60. Then, the next alpha clock pulse received on the line 72 will return the core to positive polarity saturation and no output signal will appear across the output circuit 76. However, if an input signal "*r*" is received on the line 60, with the receipt of an input signal "*p*" on the line 52, the input signals cancel, and the next alpha clock pulse received on the line 72 will produce an output signal across the load circuit. Expressed logically, the "C" type of expression is derived as follows:

$$p.\overline{r}=\overline{O}$$
$$\overline{p}+r=O$$

Figure 6:
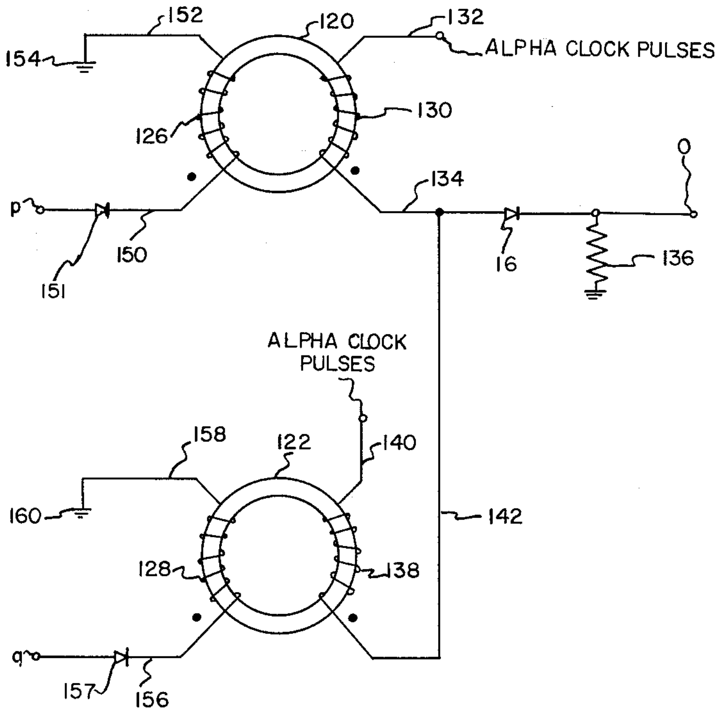
FIGURE 6 is a circuit diagram of a magnetic logic circuit element of the "D" type referred to above.
Figure 5:
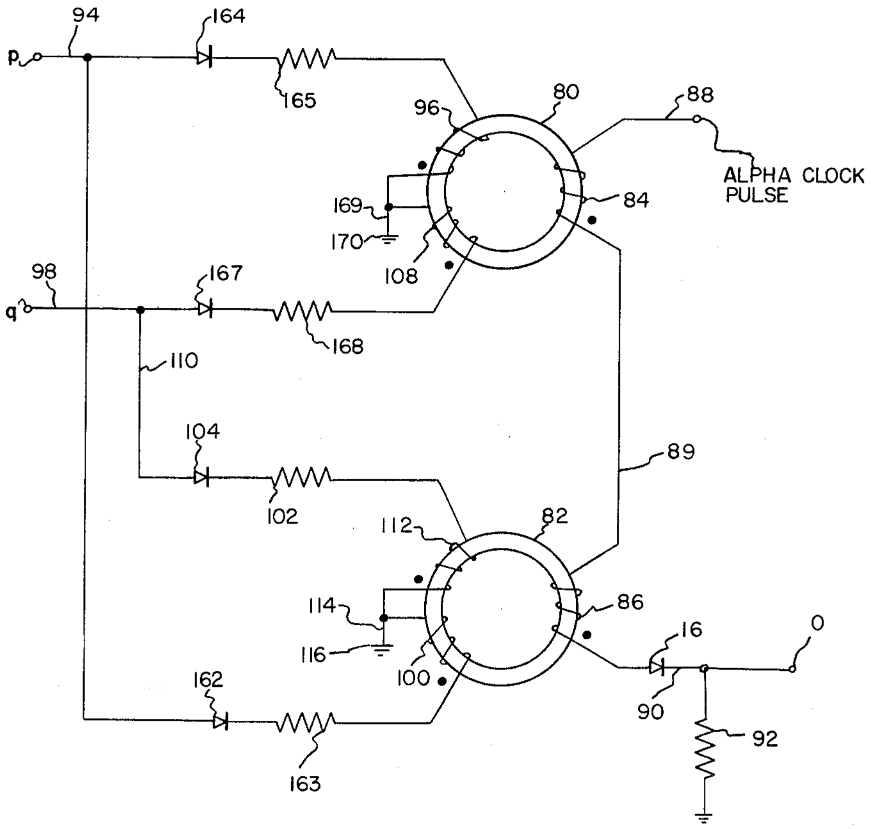
FIGURE 5 is a circuit diagram of a magnetic logic circuit element of the "E" type referred to above.

The summation of the universal type logic circuit element of FIGURE 4 leads to the formation of other logic elements, such as illustrated in FIGURES 5 and 6. In the logic element of FIGURE 5, two magnetic core members 80 and 82 are used. An inductance winding 84 associated with the core 80 is connected through a line 89 in a series circuit with an inductance winding 86, the latter inductance winding being positioned on the core 82 in magnetically coupled relation therewith. The alpha clock pulses are introduced to the windings 80 and 82 through a line 88, and a load circuit (represented by a grounded resistor 92) is connected by a line 90 through the diode 16 in series with the windings 84 and 86. The output O appears across the load circuit 92.

A first input line 94, which receives the input "*p*," is connected through a diode 164 and through a series resistor 165 to an input winding 96 on the core 80. The other terminal of the input winding 96 is connected through a line 169 to a ground point 170. The input line 94 is also connected through a diode 162 and through a series resistor 163 to an input winding 100 on the core 82. The other terminal of the input winding 100 is connected to a ground point 116 through a line 114.

A second input line 98, which receives the input $q$, is connected through a diode 167 and through a series resistor 168 to a winding 108 on the core 80. The other terminal of the winding 108 is also connected to the ground point 170. The winding 108 is wound in the opposite direction to the winding 96, as indicated by the dots in FIGURE 5. The input line 98 is also connected through a diode 104 and through a resistor 102 to a winding 112 on the core 82. The other terminal of the winding 112 is connected by a line 114 to the ground point 116. The winding 112 is wound in the opposite direction to the winding 100, as shown by the dots in FIGURE 5.

In actual practice the logic circuit element of FIGURE 5 may be constructed to use two logic circuit elements of the universal type shown in FIGURE 4. The windings 96 and 112 in FIGURE 5 each perform the function of the winding 40 in FIGURE 4, and the windings 100 and 108 in FIGURE 5 each perform the function of the winding 42 in FIGURE 4.

In the operation of the logic circuit elements of FIGURE 5, if an input signal $p$ or $q$ is received on either, but not both, of the input lines 94 or 98; one of the windings 84 or 86 will present a relatively high impedance to the following alpha clock pulse received on the line 88, so that no output will appear across the load circuit 92. Only when input signals $p$ and $q$ are received on both of the input lines 94 and 98 at the same time, or when no input signals $p$ or $q$ are received on either of the lines 94 or 98, will the next clock pulse produce an output across the load circuit 92.

The logic circuit element of FIGURE 5 functions, therefore, as a type E logic element, and its operation may be expressed logically as:

$$p.\bar{q}+\bar{p}.q=\bar{O}$$
$$p.q+\bar{p}.\bar{q}=O$$

In the logic circuit element of FIGURE 5, the series resistance elements 102, 163, 165 and 168 perform the same basic function as the series resistance element 46 in FIGURE 4. The location of these resistors in the circuit ahead of, or following, the windings of the corresponding magnetic cores does not affect the function of these resistors. The basic function of the resistors is to limit the minimum impedance of the circuits. However, in the system of FIGURE 5, the resistors have the additional function of tending to isolate the winding 96 from the winding 108, and to isolate the winding 100 from the winding 112. This isolating function of the resistors serves to minimize the mutual shunting effect of these parallel connecting windings upon one another.

The logic circuit element of FIGURE 6 is made up of two of the previously-discussed type of logic elements, which may be of the universal type discussed in conjunction with FIGURE 4. The logic elements, which make up the logic element FIGURE 6, are used to synthesize a D type of logic element.

The logic element of FIGURE 6 includes a pair of magnetic core members 120 and 122 which may be saturated in either of two polarities and which exhibit the properties of bistable flux remanence. An input winding 126 is wound on the core 120 and an input winding 128 is wound on the core 122. A winding 130 is wound on the core 120 and a winding 138 is wound on the core 122. The winding 130 is wound in the opposite direction to the winding 126, as shown by the dots in FIGURE 6, and the winding 138 is wound in the opposite direction to the winding 128, likewise, as shown by the dots.

The winding 130 is connected to the source of alpha clock pulses, and these pulses are received over the line 132. The other terminal of the winding 130 is connected by the output line 134 and through the diode 16 to the load circuit. The load circuit is represented by a grounded resistor 136, and the output O appears across the load circuit. The winding 138 is connected to the source of alpha clock pulses, and these pulses are received over a line 140. The winding 138 is also connected through the diode 16 to the load circuit 136 over a line 142.

An input line 150 which receives the $p$ input, is connected to the winding 126 on the core 120, and a diode 151 is included in that input line. The other terminal of the winding 126 is connected to a ground point 154 over a line 152. An input line 156, which receives the $q$ input, is connected to the winding 128 on the core 122, and that line includes a diode 157. The other terminal of the winding 128 is connected to a ground point 160 over a line 158.

The windings 130 and 138 are, therefore, connected in parallel. The input lines 150 and 156 function as the input circuits of a two-input logic computing element. If no input signals $p$ or $q$ are received on either of the input lines 150 or 156, both the windings 130 and 138 remain at a relatively low impedance. Therefore, under such a condition, each succeeding clock pulse produces an output across the load circuit 136. If input signals $p$ and $q$ are applied to both input lines 150 and 156 at the same time, then both the windings 130 and 138 exhibit a high impedance to the next clock pulse, and no output is produced across the load circuit.

However, if an input signal $p$ or $q$ is applied to one or the other of the lines 150 or 156, but not to both; one of the windings 130 or 138 will exhibit a relatively high impedance to the next clock pulse and one will exhibit a relatively low impedance. The low impedance winding will shunt out the high impedance winding so that the next clock pulse will produce an output across the load 136.

The logic circuit element of FIGURE 6 can be formed from two universal elements of the type shown in FIGURE 4. In FIGURE 6 the windings 126 and 128 each have the same basic function as the winding 42 in FIGURE 4. The logic circuit element of FIGURE 6 will perform the function of a D type element which, as described above, may be represented logically as:

$$p.q=\bar{O}$$
$$\bar{p}+\bar{q}=O$$

The provision of a universal type of magnetic logic circuit element, such as described in FIGURE 4, makes it possible for one type of circuit element to provide all the different types of logical functions required in a usual present day computing system. This results in a saving of components required by the computing system, and therefore a saving in cost, weight and space. The logic elements of the present invention are also advantageous in that they permit a standardization in the construction of computing systems, with a resulting increase in manufacturing and fabricating efficiency.

I claim:

1. A magnetic logic system including: a magnetic core member saturable with fluxes of opposite polarities and having properties of bi-stable flux remanence, a first winding positioned on said core and magnetically coupled thereto, a first input circuit coupled across said first winding and including a plurality of input lines for receiving different input signals and connected to a terminal of said first winding and further including a plurality of isolating means interposed in respective ones of said lines, means coupled to an input signal source and to said first input circuit for introducing to said first winding on at least one of said input lines a signal of sufficient amplitude and duration to produce a flux of a first polarity in said magnetic core member, a second winding positioned on said magnetic core member and magnetically coupled thereto, a load circuit connected to said second winding, a second input circuit connected in series with said second winding and said load circuit and including an input line, and means coupled to a clock signal source and to said second input circuit for introducing on said last-named input line a clock signal for application to said second winding and having sufficient amplitude and duration to produce a saturating flux in said magnetic core of a second polarity opposite to said first polarity so as to produce an output signal across the load circuit, said output signal having a first value in the presence of flux of said first polarity in said core member and having a second value in the presence of flux of said second polarity in said core member.

2. A magnetic logic system including: a magnetic core member saturable with fluxes of opposite polarities and having properties of bi-stable flux remanence, a first winding positioned on said magnetic core member in magnetically coupled relationship therewith and having a first terminal and a second terminal, means connecting the first terminal of the first winding to a point of reference potential, a first input circuit connected to said second terminal of said first winding and including a plurality of input lines for receiving different input signals, a corresponding plurality of signal mixing diodes included in respective ones of said input lines, means coupled to an input signal source and to said first input circuit for introducing to said first winding on one or more of said input lines a signal of sufficient amplitude and duration to produce a saturating flux of a first polarity in said magnetic core member, a second winding magnetically coupled to said magnetic core member having a first input terminal and a second input terminal, a load circuit connected between first input terminal of said second winding and a point of reference potential, a second input circuit connected to the second terminal of said second winding and including an input line, and means coupled to a source of clock pulses and to said second input circuit for introducing on said last-named input line a series of clock pulses for application to said second winding and having sufficient amplitude and duration to produce a saturating flux in said magnetic core member of a second polarity opposite to said first polarity, and said clock pulses producing an output signal across said load circuit having a first value in the presence of the saturating flux of said first polarity in said magnetic core member and having a second value in the presence of saturating flux of said second polarity in said magnetic core member.

3. A magnetic logic system including: a magnetic core member saturable with fluxes of opposite polarities and having properties of bi-stable flux remanence, a first winding positioned on said magnetic core member and magnetically coupled thereto, a first input circuit coupled across said first winding and including a plurality of input lines for receiving different input signals connected to a first input terminal of said first winding and further including a plurality of signal isolating means in respective ones of said input lines, first means coupled to a first input signal source and to said first input circuit for introducing a signal to said first winding on at least one of said input lines of said first input circuit and of sufficient amplitude and duration to produce a saturating flux of a first polarity in said magnetic core, a second input circuit coupled across said second winding and including a plurality of input lines for receiving different input signals connected to a terminal of said second winding and further including a plurality of signal isolating means in respective ones of the input lines of said last-mentioned plurality, second means coupled to a second input signal source and to said second input circuit for introducing a signal to said second winding on at least one of said input lines of said second input circuit and of sufficient amplitude and duration to produce a saturating flux of a second polarity opposite to said first polarity in said magnetic core member, a third winding positioned on said magnetic core member and magnetically coupled thereto, a load circuit connected to said third winding, a third input circuit connected in series with said third winding and with said load circuit and including an input line, and means coupled to a clock signal source and to said third input circuit for introducing a first series of clock pulses to said third winding of sufficient amplitude and duration to reverse the saturating flux in said magnetic core member from said first polarity to said second polarity to produce an output signal across the load circuit having a first value in the presence of flux of said first polarity in said core member and having a second value in the presence of flux of said second polarity in said core member.

4. The combination defined in claim 3 and which includes further means coupled to a source of further clock pulses for introducing to one of said input lines of said second input circuit a second series of clock pulses phase-displaced from said first series.

5. The combination defined in claim 3 and in which a plurality of mixing diodes is included in respective ones of said input lines of said first and second input circuits to constitute said signal isolating means.

6. A magnetic logic system including: a magnetic core member saturable with fluxes of opposite polarities and having properties of bi-stable flux remanence, a first winding magnetically coupled to the core member and having a first terminal and a second terminal, a second winding magnetically coupled to the core member and having a first terminal and a second terminal, means for connecting the first terminal of said first winding and the first terminal of said second winding to a point of reference potential, a first input circuit connected to the second terminal of said first winding and including a plurality of input lines for receiving different input signals, a plurality of signal-mixing diodes included in respective ones of said input lines of said first input circuit, first means coupled to a first input signal source and to said first input circuit for introducing a signal to said first winding on any one or more of said input lines of said first input circuit of sufficient amplitude and duration to produce a saturating flux of a first polarity in said magnetic core member, a second input circuit connected to a second terminal of said second winding and including a plurality of input lines for receiving different input signals, a plurality of signal-mixing diodes included in respective ones of said input lines of said second input circuit, second means coupled to a second input signal source and to said second input circuit for introducing a signal to said second winding on any one or more of said input lines thereof and of sufficient amplitude and duration to produce a saturating flux of a second polarity opposite to said first polarity in said magnetic core member, a third winding magnetically coupled to said magnetic core member having a first terminal and a second terminal, a load circuit connected to the first terminal of said third winding and to a point of reference potential, and a third input circuit connected to the second terminal of said third winding and including an input line, and means coupled to a source of clock pulses and to said third input circuit for introducing a series of clock pulses to the third winding on said last-named input line with sufficient amplitude and duration to produce a saturating flux in said magnetic core member of said second polarity, and said clock pulses producing an output signal across the load circuit having a first value in the presence of the saturating flux of said first polarity in said magnetic core member and having a second value in the presence of the saturating flux of said second polarity in said core member.

References Cited in the file of this patent

UNITED STATES PATENTS

| | | |
|---|---|---|
| 2,697,825 | Lord | Dec. 21, 1954 |
| 2,772,357 | An Wang | Nov. 27, 1956 |
| 2,846,593 | Sands | Aug. 5, 1958 |